United States Patent Office 2,766,262
Patented Oct. 9, 1956

2,766,262

ANTHRAQUINONE DYESTUFFS

Philip Leigh Belshaw, Blackley, Manchester, England, assignor to Imperial Chemical Industries Limited, a corporation of Great Britain No Drawing. Application August 10, 1954,
Serial No. 448,993

Claims priority, application Great Britain August 14, 1953

10 Claims. (Cl. 260—376)

This invention relates to new dyestuffs and more particularly to new blue dyestuffs of the antrhaquinone series which are especially valuable for dyeing acetate rayon textile materials.

According to our invention we provide new dyestuffs of the formula:

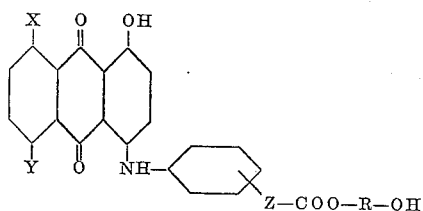

wherein X and Y represent hydrogen or hydroxyl or nitro groups, Z represents a —$CH_2$—, —O—$CH_2$, —$CH_2$—$CH_2$ or —CH=CH— radical and R represents an alkylene radical.

The alkylene radical, R, may be for example an ethylene, propylene, isopropylene, or butylene radical.

According to a further feature of our invention we provide a process for the manufacture of new dyestuffs which comprises heating a glycol or functional derivative thereof with an alkyl ester of the formula:

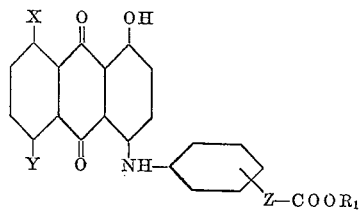

wherein X and Y represent hydrogen, or hydroxyl or nitro groups, Z represents a —$CH_2$—, —O—$CH_2$—, —$CH_2$—$CH_2$—, or —CH=CH— radical and $R_1$ represents a lower alkyl group.

The lower alkyl radical, $R_1$, may be for example a methyl or ethyl radical.

The alkyl ester used as starting material in the process of our invention may be made for example by condensing the appropriate 1-hydroxy-4-nitroanthraquinone with an amine of the formula $NH_2$—$C_6H_4$—Z—$COOR_1$ where Z and $R_1$ have the significance given above. This condensation may be effected by heating the reactants together, the amine being conveniently in excess and the reaction temperature being preferably between 100° C. and 130° C. The heating step may if desired be carried out in the presence of a solvent for example β-ethoxyethanol or other inert liquid diluent.

As suitable 1-hydroxy-4-nitroanthraquinones there may be mentioned for example 1:5-dihydroxy-4:8-dinitroanthraquinone, 1:5:8-trihydroxy-4-nitro-anthraquinone and 1:8-dihydroxy-4:5-dinitro-anthraquinone.

The reaction between the alkyl ester and the glycol may conveniently be carried out by heating the alkyl ester with an excess of glycol, preferably in the presence of a substance which is known from the literature or which is used in practice to facilitate an ester-interchange reaction, for example p-toluene sulphonic acid. At least one molecular proportion of glycol must be used for each molecular proportion of the alkyl ester. A mixture of alkyl esters or a mixture of glycols may be used to obtain a dyestuff mixture of a particular shade. It is advantageous to use an excess of glycol as solvent for the reaction and in general the use of about 20 or more molecular proportions of the glycol to each molecular proportion of alkyl ester and the use of a reaction temperature of between 100° C. and 150° C. will be found convenient in practice. The reaction product may conveniently be isolated by cooling the reaction mixture and pouring it into water, adding salt and then filtering off the product.

The new dyestuffs so obtained may be dispersed by milling them with water and a dispersing agent to form an aqueous paste suitable for use in dyeing acetate rayon or artificial fibres formed from synthetic materials or if desired the aqueous paste may be dried to form a dispersible powder which may be obtained in a non-dusting form by any of the processes known for forming non-dusting powders.

The new anthraquinone dyestuffs of our invention have very good affinity for acetate rayon to wihch they impart a blue colour which is fast to light and which has a high resistance to the action of combustion products of coal gas. The new dyestuffs either singly or in the form of mixtures are also valuable for colouring polyester fibres or other artificial fibres formed from synthetic material.

The invention is illustrated but not limited by the following examples in which the parts are by weight:

*Example 1*

A mixture of 1 part of 1:8-dihydroxy-4-nitro-5-p-carbethoxymethyl-anilino-anthraquinone, 0.1 part of p-toluenesulphonic acid and 40 parts of propylene glycol is stirred for 16 hours at 120–130° C., the volatile material being allowed to distil off during the heating. The mixture is cooled to 90° C. and poured into 200 parts of water. Salt is then added and the suspension is warmed to 35° C. and filtered. The solid residue on the filter is washed well with water and the filter cake milled to form an aqueous dispersion. The product dyes acetate rayon in strong, attractive blue shades, possessing excellent fastness to burnt-gas fumes and to light.

The 1:8-dihydroxy-4-nitro-5-carbethoxy-methylanilino-anthraquinone used as starting material in the above example may be prepared by condensing 1:8-dihydroxy-4:5-dinitro-anthraquinone with ethyl p-aminophenylacetate.

In place of the 1 part of 1:8-dihydroxy-4-nitro-5-p-carbethoxymethyl-anilino-anthraquinone used in the above example, 1 part of 1:8-dihydroxy-4-nitro-5-p-β-carbomethoxyethyl-anilinoanthraquinone (obtainable by condensing 1:8-dihydroxy-4:5-dinitro-anthraquinone with methyl-β-p-aminophenylpropionate) may be used. A dyestuff of similar shade and fastness properties is obtained.

*Example 2*

A mixture of 1 part of 1:8-dihydroxy-4-nitro-5-p-carbomethoxymethyl-anilino-anthraquinone, 1 part of 1:5 - dihydroxy-4-nitro-8-p-carbomethoxy-methyl-anilino-anthraquinone, 0.2 part of p-toluenesulphonic acid, 40 parts of propylene glycol and 40 parts of ethylene glycol is stirred at 120–130° C. for 24 hours, the volatile material being allowed to distil off during the heating. The mixture is cooled to 80° C. and poured into 400 parts of water. Salt is then added and the suspension is warmed to 40° C. and filtered. The solid residue on the filter is washed well with water and the filter cake milled to form an aqueous dispersion. The product which is a mixture of dyestuffs dyes acetate rayon in strong, attractive blue shades, possessing excellent fastness to burnt-gas fumes and to light.

The anthraquinone intermediates used in this example may be prepared by condensing methyl p-aminophenyl-acetate with 1:8-dihydroxy-4:5-dinitro and 1:5-dihydroxy-4:8-dinitroanthraquinone respectively.

*Example 3*

A mixture of 1 part of 1:8-dihydroxy-4-nitro-5-p-carbethoxymethoxy-anilino-anthraquinone, 0.1 part of p-toluene sulphonic acid, 25 parts of propylene glycol and 25 parts of ethylene glycol is stirred at 120–130° C. for 48 hours, the volatile material being allowed to distil off during the heating. The product is isolated as described in Example 2 and milled to form an aqueous dispersion. The product which is a mixture of 2 dyestuffs dyes acetate rayon in strong reddish-blue shades.

The 1:8-dihydroxy-4-nitro-5-p-carbethoxymethoxy-anilino-anthraquinone used as starting material in this example may be prepared by condensing 1:8-dihydroxy-4:5-dinitroanthraquinone with ethyl p-aminophenoxy-acetate.

*Example 4*

A mixture of 1 part of 1:8-dihydroxy-4-nitro-5-m-carbethoxymethyl-anilino-anthraquinone, 0.1 part of p-toluenesulphonic acid, 20 parts of ethylene glycol and 20 parts of propylene glycol is stirred for 24 hours at 120–130° C., any volatile material being allowed to distil off during heating. The mixture is cooled to 80° C. and poured into 200 parts of water. Salt is then added and the suspension is filtered. The solid residue on the filter is washed well with water and the filter cake is milled to form an aqueous dispersion. The product which is a mixture of 2 dyestuffs dyes acetate rayon in strong, attractive blue shades possessing excellent fastness to burnt-gas fumes and to light.

The 1:8-dihydroxy-4-nitro-5-m-carbethoxymethyl-anilino-anthraquinone used as starting material in the above example may be prepared by condensing 1:8-dihydroxy-4:5-dinitroanthraquinone with ethyl m-aminophenylacetate.

*Example 5*

A mixture of 1 part of the 1:8-dihydroxy-4-nitro-5-β-m-carbethoxyvinyl-anilino-anthraquinone (which may be obtained by condensing 1:8-dihydroxy-4:5-dinitroanthraquinone with ethyl m-aminocinnamate), 0.1 part of p-toluenesulphonic acid, 20 parts of propylene glycol and 20 parts of ethylene glycol is stirred for 48 hours at 130–135° C., the volatile material being allowed to distil off during the heating. The mixture is cooled to 80° C. and poured into 200 parts of water. Salt is then added and the suspension is filtered. The isolated product, which is a mixture of two dyestuffs, dyes acetate rayon in blue shades.

What I claim is:

1. Dyestuffs of the formula:

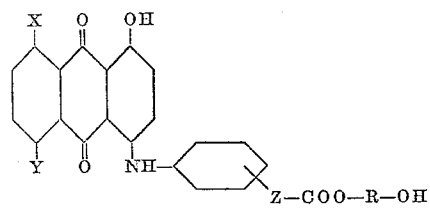

wherein X and Y represent a member of the group consisting of hydrogen, hydroxyl, and nitro radicals, Z represents a member of the group consisting of —CH$_2$—, —O—CH$_2$—, —CH$_2$—CH$_2$—, and —CH=CH— radicals, and R represents an alkylene radical.

2. Process for the manufacture of dyestuffs which comprises heating a glycol with an alkyl ester of the formula:

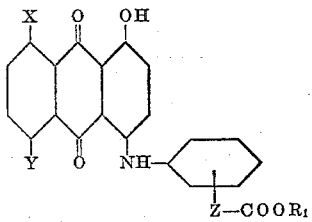

wherein X and Y represent a member of the group consisting of hydrogen, hydroxyl and nitro radicals, Z represents a member of the group consisting of —CH$_2$—, —O—CH$_2$—, —CH$_2$—CH$_2$—, and —CH=CH— radicals and R$_1$ represents a lower alkyl group.

3. Process according to claim 2 wherein an excess of glycol is used as solvent for the reaction.

4. Process according to claim 2 wherein at least two alkyl esters are heated with the glycol.

5. Process according to claim 2 wherein at least two glycols are heated with said ester.

6. The dyestuff having the formula:

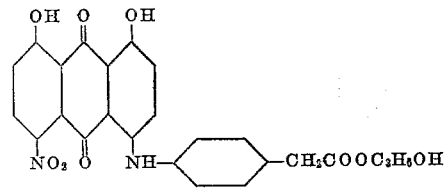

7. The dyestuff having the formula:

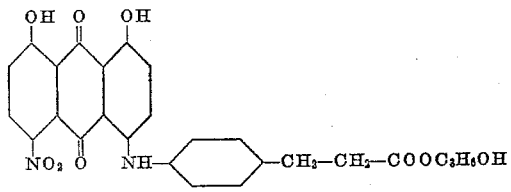

8. A mixture of dyestuffs having the following formulae:

(a)
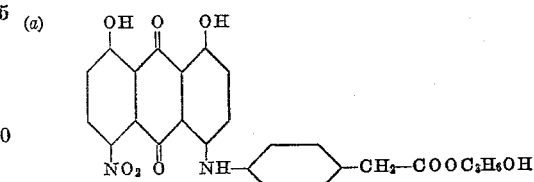

(b)
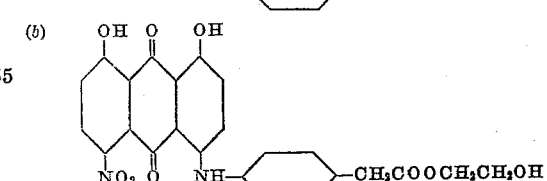

(c)
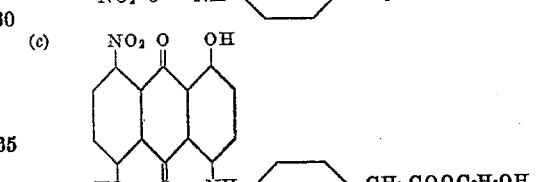

(d)
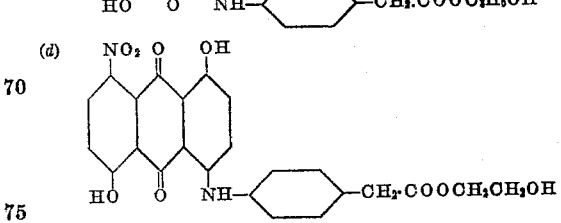

9. A mixture of the dyestuff having the formula:
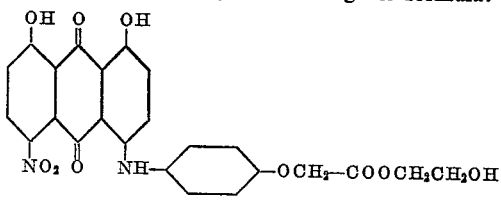
and the dyestuff having the formula:
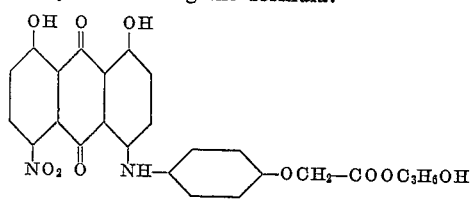
10. A mixture of the dyestuff having the formula:
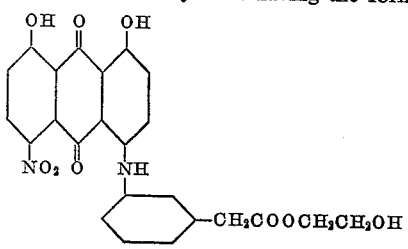
and the dyestuff having the formula:
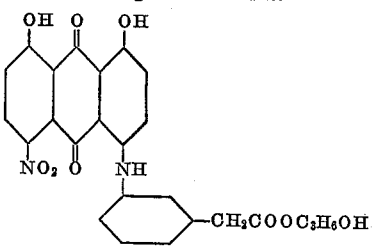
References Cited in the file of this patent
UNITED STATES PATENTS
| | | |
|---|---|---|
| 2,333,384 | Klein | Nov. 2, 1943 |
| 2,419,405 | Klein | Apr. 22, 1947 |